Dec. 18, 1951  C. A. ROCKWELL  2,579,092
INTERMITTENT TRANSLATIONAL DEVICE
Filed March 17, 1950
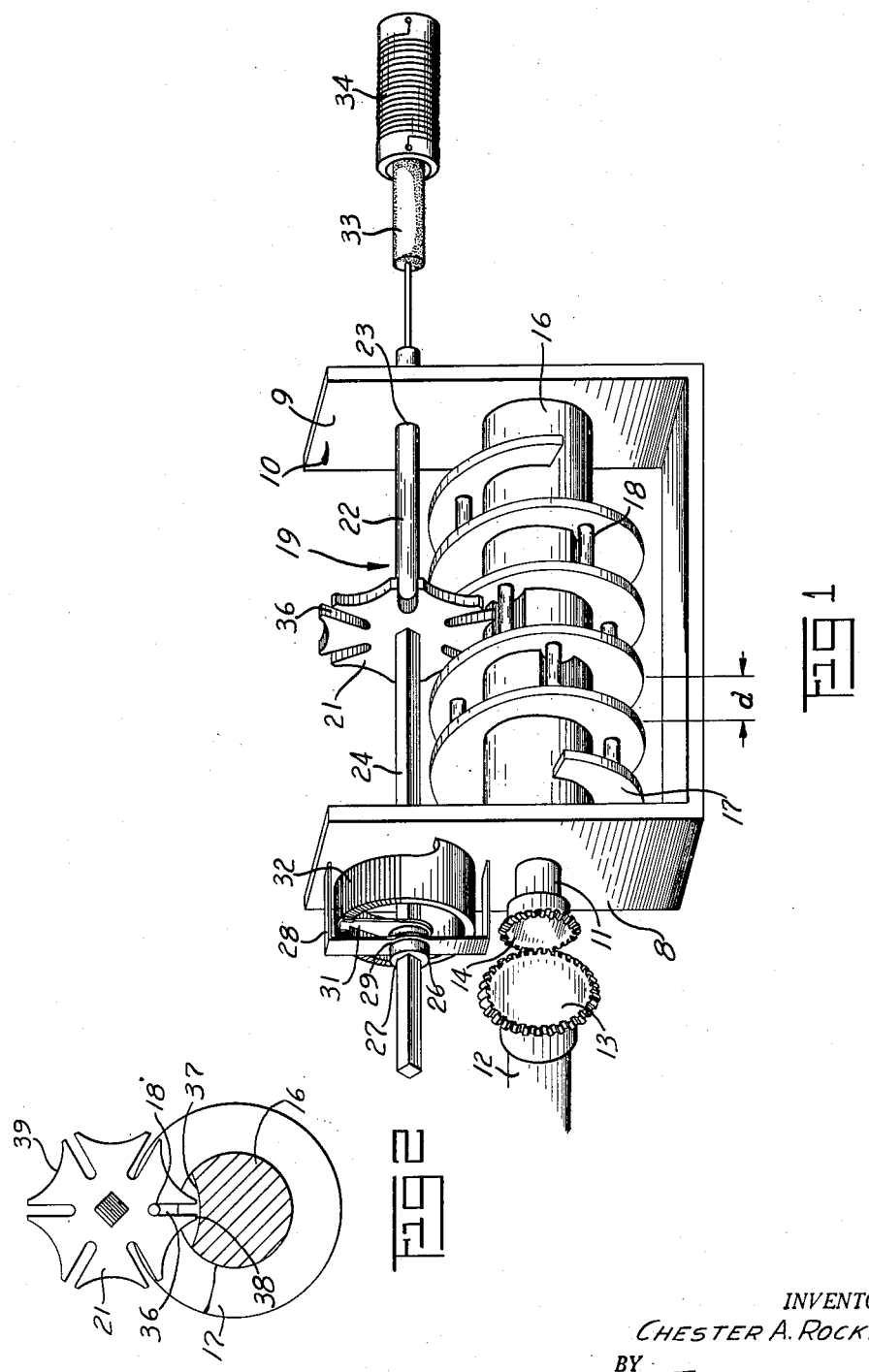
INVENTOR.
CHESTER A. ROCKWELL
BY
ATTORNEY Patented Dec. 18, 1951

2,579,092

UNITED STATES PATENT OFFICE 2,579,092

INTERMITTENT TRANSLATIONAL DEVICE

Chester A. Rockwell, Cedar Rapids, Iowa, assignor to Collins Radio Company, Cedar Rapids, Iowa, a corporation of Iowa Application March 17, 1950, Serial No. 150,279

6 Claims. (Cl. 74—24)

This invention relates in general to apparatus for obtaining intermittent motion, and in particular to a device for imparting translational and intermittent motion simultaneously to a shaft.

In the intricate machines built by man today, it is often desirable to impart more or less unusual motions to parts. For example, in a radio transmitter it may be desirable to slug-tune a coil which requires that a slug be moved longitudinally of a coil. At the same time, it may be desired to drive a rotary resistor which requires that a shaft receive rotational motion.

It is an object of this invention, therefore, to provide a device for imparting translational and rotational motion to a shaft.

Another object of this invention is to provide means for moving a shaft longitudinally and simultaneously imparting intermittent rotational motion thereto.

Yet another object of this invention is to provide means for moving a shaft longitudinally at either a constant or varying rate while imparting rotary intermittent motion to the same shaft at a constant or varying rate.

A feature of this invention is found in the provision for a driven member carrying a helix thereon which engages a star wheel mounted on a driven shaft. A plurality of pins extending across the helix mesh with the star wheel to impart intermittent rotary motion thereto, while the helix imparts longitudinal motion to the shaft.

Further objects, advantages, and features of this invention will become apparent from the following description and claims when read in view of the drawings; in which Figure 1 is an isometric projection of the intermittent-translational apparatus of this invention, and Figure 2 is a sectional view of the apparatus shown in Figure 1.

Figure 1 of this invention illustrates a generally U-shaped bracket member 10. A driving shaft 11 is pivotally mounted for rotational motion in the bracket 10. A shaft 12 terminates in the gear 13 which meshes with a gear 14 carried on the end of shaft 11. A suitable driving means, not shown, is connected to the shaft 12 and provides the motive power for actuating the driving shaft 11. Between the arms of the bracket 10, the shaft 11 has an enlarged diameter portion 16 which prevents the shaft 11 from moving longitudinally of the bracket 10. Connected to the enlarged diameter portion 16 is a helix fin 17. Located at different points on the helix 17 are pins 18 which extend from one turn of the helix to an adjacent turn. The pins 18 are offset radially from the periphery of the enlarged-diameter portion 16 and there is a slot cut directly beneath each pin.

A driven shaft 19 is slidably and rotatably supported in the bracket 10 and carries thereon the star-wheel 21 between the legs of bracket 10. The shaft 19 may be rotated relative to the bracket 10 and may also be moved longitudinally thereof. Means for doing this include a round portion of the shaft 22 which extends through an opening 23 formed in one arm 9 of the bracket 10 in a loose fit so that the shaft 19 may both rotate and slide therethrough.

The opposite end of the shaft 19 may be of an irregular cross-sectional area as, for example, a square, and is received in a collar 26. The collar 26 has a square hole 27 formed therein which receives the shaft 24 therein in such a manner that the shaft 24 may move longitudinally of the collar 26 but may not rotate relative thereto due to the irregular cross-sectional area of the shaft. A holding bracket 28 is of a generally U shape and is attached to the bracket 10. The holding bracket 28 has an opening 29 formed in the center portion thereof for receiving the collar 26. The collar 26 is mounted in the holding bracket 28 in such a manner that it may be rotated but may not be moved longitudinally. A slide contact 31 may be connected to the bracket 26 to rotate with it. The slide contact 31 may engage a rotary rheostat 32 carried on the bracket 10. The end 22 of the shaft 19 may terminate in a slug 33 of a variable inductance 34. Thus if the shaft 19 is rotated the rheostat 32 will be adjusted, and if the shaft 19 is moved longitudinally of the bracket 10, the slug 33 is adjusted relative to the inductance coil 34.

Means are provided for furnishing these two motions to shaft 19 simultaneously. In operation the driving means, not shown, rotate the shaft 12 which in turn actuates the driving shaft 11 through the gears 13 and 14. The helix 17 and the pins 18 rotate with the shaft 11. The star-wheel 21 carried on the shaft 19 extends down toward the shaft 11 so that the helix 17 engages it and causes the shaft 19 to move longitudinally as the shaft 11 rotates. It is to be understood, of course, that the shaft 11 may be driven in either direction and thus may impart longitudinal motion to the shaft 19 either to the right or left relative to Figure 1. The longitudinal backlash of the device depends on the distance between adjoining turns of the helix 17. As the shaft 11 rotates, a pin 18 is received in a slot 36 formed in the star wheel 21 and intermittent rotary motion is imparted the shaft 19 as the shaft 11 moves at a constant rate.

As shown in Figure 2, when the pin 18 fits into a slot 36 on the star wheel 21 it rotates it until the pin 18 emerges from the slot tangent to the center of shaft 11. It is to be noted that the enlarged diameter 16 is undercut to form slots 37 underneath each pin 18. This allows the points 38 of the star wheel to rotate relative to the enlarged diameter 16. After the pin 18 has emerged from the slot 36, the enlarged diameter 16 engages a curved portion 39 of the star wheel to hold it in a fixed rotary position until the next pin engages the next slot of the star wheel. For a more detailed explanation of the pin-star wheel motion, reference may be had to the patent issued to Cyr, No. 699,910, dated May 13, 1902.

It is seen that this invention provides means for imparting both translational and intermittent rotation to a shaft. This type of motion may be used for driving a rotary element simultaneously with a longitudinal element. Although a slug-tuned inductance and a rotary resistor have been used as examples, it is to be understood that the invention is not to be limited to such devices, as they are shown for illustrative purposes only. Many other uses for applicant's invention may be given. A plurality of combinations of motion may be obtained by the shape of the helix 17 and the placing of the pins 18. Thus intermittent rotary motion may be imparted to shafts 19 by uniform placing of the pins 18, or, alternatively, non-uniform intermittent motion may be imparted to the shaft by varying the spacings between adjacent pins. Likewise, the longitudinal motion may be either constant or variable, depending upon whether the lead of the spiral 17 is constant or variable. Any combination which imparts intermittent-rotary motion and longitudinal motion to a shaft in the manner illustrated by applicant falls within the broad scope of the invention.

I claim:

1. Apparatus for transferring rotational and longitudinal motion to a driven shaft comprising, a driving shaft connected to a driving means, a helix mounted on said driving shaft, a plurality of longitudinal pins extending across adjacent turns of said helix, a driven shaft rotatably supported adjacent said driving shaft, and a star-wheel carried on said driven shaft and received between said helix and engageable with said longitudinal pins.

2. Apparatus for imparting longitudinal and intermittent rotational motion to a shaft comprising a bracket, a driving shaft rotatably supported in said bracket, driving means connected to said driving shaft, a helix mounted on said driving shaft, a plurality of pins mounted between adjacent turns of said helix parallel to said driving shaft, a driven shaft rotatably and slidably supported in said bracket, a star-wheel rigidly mounted to said driven shaft, and said star-wheel received between adjacent turns of said helix and engageable with said pins to receive longitudinal and intermittent rotational motion.

3. Apparatus for imparting rotational and longitudinal motion to a driven shaft comprising a driving shaft, a bracket of a generally U shape rotatably supporting said driving shaft, a driven shaft rotatably and slidably mounted in said bracket substantially parallel to said driving shaft, a helix mounted on said driving shaft, a star wheel rigidly mounted on said driven shaft and in engagement with said helix, a plurality of longitudinal pins on said helix, and said star wheel engaged by said pins and said helix to translate longitudinal and intermittent rotational motion to said driven shaft in response to rotation of said driving shaft.

4. Apparatus for imparting longitudinal and intermittent rotary motion to a driven shaft comprising bracket means rotatably supporting a driving shaft, a driven shaft slidably and rotatably supported by said bracket, driving means connected to said driving shaft, a star wheel of the Geneva movement type mounted on said driven shaft, a helix mounted on said driving shaft, a plurality of pins extending between adjacent turns of said helix and parallel to said driving shaft, and said star wheel engageable with said pins and said helix for receiving longitudinal and intermittent rotational motion therefrom.

5. A system according to claim 4 wherein said pins are spaced equidistant about the periphery of said spiral.

6. Apparatus according to claim 4 wherein said pins are spaced in a random manner about said spiral.

CHESTER A. ROCKWELL.

REFERENCES CITED

The following references are of record in the file of this patent:

UNITED STATES PATENTS

| Number | Name | Date |
|---|---|---|
| 597,566 | Richards | Jan. 18, 1898 |

FOREIGN PATENTS

| Number | Country | Date |
|---|---|---|
| 196,451 | Germany | Mar. 16, 1908 |